(12) United States Patent
Li et al.

(10) Patent No.: US 12,107,623 B2
(45) Date of Patent: *Oct. 1, 2024

(54) 10G RATE OLT TERMINAL TRANSCEIVER INTEGRATED CHIP BASED ON XGPON WITH EML LASER

(71) Applicant: XIAMEN EOCHIP SEMICONDUCTOR CO., LTD, Xiamen (CN)

(72) Inventors: Jinghu Li, Xiamen (CN); Zhang Fan, Xiamen (CN); An Lin, Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,771

(22) Filed: May 26, 2023

(65) Prior Publication Data

US 2023/0388011 A1    Nov. 30, 2023

(30) Foreign Application Priority Data

May 26, 2022    (CN) .......................... 202210589725.3

(51) Int. Cl.
| | | |
|---|---|---|
| *H04B 10/038* | (2013.01) | |
| *H04B 10/40* | (2013.01) | |
| *H04B 10/50* | (2013.01) | |

(52) U.S. Cl.
CPC ........... *H04B 10/038* (2013.01); *H04B 10/40* (2013.01); *H04B 10/503* (2013.01)

(58) Field of Classification Search
CPC ....... H04B 10/38; H04B 10/40; H04B 10/503
(Continued)

(56) References Cited

U.S. PATENT DOCUMENTS

| | | | |
|---|---|---|---|
| 2015/0104179 A1* | 4/2015 | Wang ............... | H04B 10/07955 398/81 |
| 2018/0167143 A1* | 6/2018 | Yao ..................... | H04B 10/524 |

(Continued)

FOREIGN PATENT DOCUMENTS

| | | |
|---|---|---|
| CN | 102412897 A | 4/2012 |
| CN | 106851443 A | 6/2017 |

(Continued)

OTHER PUBLICATIONS

Wu Ximin, PON network ONU end optical transceiver module single-chip solution, "China Integrated Circuits", vol. 20, Issue 2, Feb. 28, 2011, pp. 43-47.

(Continued)

*Primary Examiner* — Dalzid E Singh
(74) *Attorney, Agent, or Firm* — Novoclaims Patent Services LLC; Mei Lin Wong

(57) ABSTRACT

A 10G rate OLT terminal transceiver integrated chip based on XGPON and EML laser includes: a burst mode receiver RX which amplifies an electrical signal originated each ONU client and processed through a burst mode receiver TIA, processes amplitude and frequency double-detection, and outputs the signal whose amplitude and waveform pulse width met the threshold requirements to a host, and comprises a fast recovery module to meet the timing sequence requirement of the XGPON protocol; a continuous mode transmitter TX which receives the electrical signal attenuated by a PCB board, and selects a bypass BYPASS path or a clock data recovery CDR path according to a degree of attenuation to drive the EML laser; a digital control unit DIGIITAL which provides control signals to the burst mode receiver RX and the continuous mode transmitter TX; and a power module POWER to supply working power to the chip.

8 Claims, 6 Drawing Sheets

(58) Field of Classification Search
USPC .............................................................. 398/5
See application file for complete search history.

(56) References Cited

U.S. PATENT DOCUMENTS

2019/0305871 A1* 10/2019 Lee ..................... H04J 14/0227
2023/0388011 A1* 11/2023 Li .......................... H04B 10/40

FOREIGN PATENT DOCUMENTS

| CN | 106953696 A | 7/2017 |
| CN | 106953697 A | 7/2017 |
| CN | 108390725 A | 8/2018 |
| JP | 2015220567 A | 12/2015 |
| KR | 2010061266 A | * 6/2010 |

OTHER PUBLICATIONS

Wang Lei, Design and Implementation of 10G EPON Symmetric OLT Transceiver, "Communication Technology", vol. 53, Issue 7, Jul. 10, 2020, pp. 1824-1831.

Li Chang et al., Design of symmetric OLT optical modules in 10 Gbit/s EPON systems, "Study on Optical Communications", 2013 Issue 1 (Issue 175), Feb. 28, 2013, pp. 33-35, 38.

* cited by examiner

10G RATE OLT TERMINAL TRANSCEIVER INTEGRATED CHIP BASED ON XGPON WITH EML LASER

FIELD OF INVENTION

The present invention relates to the field of integrated circuit and optical communication.

DESCRIPTION OF RELATED ARTS

In an optical communication central office equipment OLT (abbreviation for Optical Line Termination, optical line terminal), a burst limiting amplifier LA completes the limit amplification of the different amplitude electrical signals transmitted by the upper burst transimpedance amplifier TIA. LA also includes a LOS (Loss of Signal, loss of signal) module, which judges whether the LA input signal is noise or is a signal that meets the requirements and performs the operation of turning off or opening the main channel. The continuous Laser Diode Driver LDD converts the data flow of the electrical signal into a modulated current to drive the laser to emit light and transmit the optical signal. The LDD includes a threshold configuration module to cooperate with the automatic optical power control APC and automatic temperature control ATC modules to complete the feedback control of the LDD.

The commonly used laser types are: VCSEL, DFB and EML. Vertical cavity surface emitting laser VCSEL (Vertical Cavity Surface Emitting Laser) has low production cost and is suitable for high-speed and short-distance transmission. DFB (Distribution-Feedback Laser) has a relatively high production cost and can provide high power for long-distance transmission. EML (Electro-Absorption Modulation with Laser) is expensive and has a high voltage requirement, but it can be used for transmission distance of over 100 km. The DFB laser controls the intensity of the output light by current input. The bias current BIAS biases the DFB laser at the light-emitting threshold point, and then outputs the modulation current MOD through the laser driver to control the light on and off status of the DFB laser which is corresponding to 1 and 0 of the data stream. However, changes in the injection current lead to changes in the carrier concentration, which in turn causes changes in the refractive index and wavelength. The change of the wavelength causes the chirp effect, and the dispersion of the fiber itself eventually leads to the extension of the pulse width and the distortion of the signal. Therefore, the upper limit of transmission distance using DFB laser is 10 km. The transmission rate is also limited by the length of time the modulation current is input.

In order to increase the transmission distance of the laser, an EML laser can be used. The injection current (BIAS current) of the EML laser does not change, and it can output continuous light. The light intensity is changed by the external electro-absorption modulator using the electro-absorption effect to achieve the purpose of signal modulating. The electro-absorption modulator does not apply an external electric field, the incident light passes through the material without being absorbed, and signal 1 is transmitted when it emits light. When an external electric field is applied, the incident light is absorbed by the material, and signal 0 is transmitted when the light is turned off. Therefore, the laser driver can modulate the intensity of the output light field by changing the output voltage amplitude according to the data stream.

EML lasers are superior to DFB lasers in terms of chirp effect, extinction ratio, eye diagram quality, jitter level, and transmission distance. The advantages of DFB lasers are small size, lower purchase price and lower power consumption.

In order to ensure that the EML laser meets the strict protocol requirements for carrier-grade signal transmission, it is necessary to control the EML laser to work in a specific temperature range (55° C.-65° C.), and uses its integrated TEC (Thermo Electric Cooler) to control the work temperature. The cooler also consumes most of the power consumption while ensuring the working temperature of the laser. Therefore, under the premise of controlling the current and overall power consumption of the optical module (<550 mA), the transceiver integrated chip used with the EML laser needs to further compress power consumption.

The passive optical network are generally divided into three specific implementation methods: APON based on ATM transmission protocol, EPON based on Ethernet, and GPON with a rate above Gbit. Among these three implementations, GPON can provide higher speed, higher access performance and network efficiency, and stronger flexibility and scalability. It can meet the bandwidth requirements of various existing and future services.

Therefore, in view of the above deficiencies, it is necessary to upgrade the rate of the OLT terminal based on the GPON standard so that it can meet the needs of the market and achieve low cost and high rate.

SUMMARY OF THE PRESENT INVENTION

An object of the present invention is to solve the existing low rate problem of the existing OLT terminal based on GPON standard, and provide a 10G rate OLT terminal transceiver integrated chip based on XGPON and EML laser.

According to the present invention, a 10G rate OLT terminal transceiver integrated chip based on XGPON and EML laser comprises: a burst mode receiver RX, a continuous mode transmitter TX, a digital control unit DIGIITAL and a power module POWER.

The burst mode receiver RX amplifies an electrical signal which is originated from an optical signal from each ONU client and processed through a burst mode receiver TIA, processes amplitude and frequency double-detection of the electrical signal, outputs the detection results of the electrical signal whose amplitude and waveform pulse width met the threshold requirements to a host, and uses a fast recovery module to control the timing sequence to meet the XGPON protocol.

The continuous mode transmitter TX receives the electrical signal attenuated by a PCB board, and according to the degree of attenuation, selects a bypass path BYPASS for transmission or outputs the electrical signal after the signal quality is improved through a clock data recovery CDR path to drive an EML laser.

The digital control unit DIGIITAL is arranged to provide control signals for the burst mode receiver RX and the continuous mode transmitter TX.

The power module POWER is arranged for power supply to the chip.

Preferably, the burst mode receiver RX comprises a pre-amplifier Pre_Amplifier, a signal detection unit, a 2.5G burst limiting amplifier BurstLA 2.5G, a current mode logic output buffer CML Buffer, a signal detection output buffer Buffer and a fast recovery module, wherein the signal detection unit comprises a level detector LEVEL DETECTOR and a frequency detector FREQUENCY DETECTOR;

a non-inverting input and an inverting input of the pre-amplifier Pre_Amplifier are arranged to receive a burst data packet from the burst transimpedance amplifier TIA; the fast recovery module is arranged to provide a fast recovery circuit to ensure the timing is correct, so that physical collision of two burst data packets before and after is avoided;

an output terminal of the pre-amplifier Pre_Amplifier is simultaneously connected to an input terminal of the 2.5G burst limiting amplifier BurstLA 2.5G and an input terminal of the signal detection unit;

an output terminal of the 2.5G burst limiting amplifier BurstLA 2.5G is connected to an input terminal of the current mode logic output buffer CML Buffer;

an output terminal of the signal detection unit is simultaneously connected to an input terminal of the signal detection output buffer Buffer and an on/off control terminal of the current mode logic output buffer CML Buffer;

two output terminals of the current mode logic output buffer CML Buffer are connected to output pins RX_OUTP and RX_OUTN of the burst mode receiver RX respectively;

an output terminal of the signal detection output buffer BUFFER is connected to a chip pin RX_SD, and the burst mode receiver RX sends a detection result to the host through the chip pin RX_SD;

when a reset signal sent by the host is received from a chip pin LA_RESET, the chip sends a feedback signal to the host through the pin RX_SD.

Preferably, the fast recovery module is built-in or external to the burst mode receiver RX. The fast recovery module includes resistors R7, R8, R9, R10, and switches S1, S2;

when the fast recovery module is external to the burst mode receiver RX, a non-inverting output terminal of the burst transimpedance amplifier TIA is connected to one end of the resistor R10 of the fast recovery module, one end of the resistor R8 of the fast recovery module and a non-inverting input pin RX_INP of the chip through an AC coupling capacitor C9;

an inverting output terminal of the burst transimpedance amplifier TIA is connected to one end of the resistor R9 of the fast recovery module and one end of the resistor R7 of the fast recovery module, and an inverting input pin RX_INN of the chip through the AC coupling capacitor C8;

a non-inverting input pin RX_INP of the chip and an inverting input pin RX_INN of the chip are connected to a non-inverting input terminal and an inverting input terminal of the pre-amplifier Pre_Amplifier respectively;

another end of the resistor R10 is connected to one end of the switch S1;

another end of the resistor R9 is connected to one end of the switch S2;

control ends of the switches S1 and S2 are connected to a reset signal line LA_RESET simultaneously; and a reference voltage pin Vref of the burst mode receiver RX is simultaneously connected to another end of the resistor R7, another end of the R8, another end of the switch S1 and another end of the switch S2.

When the fast recovery module is built in the burst mode receiver RX, a non-inverting output terminal and an inverting output terminal of the burst transimpedance amplifier TIA are connected to a non-inverting input pin RX_INP and an inverting input pin RX_INN of the chip through AC coupling capacitors C9 and C8;

inside the chip, the non-inverting input pin RX_INP of the chip is connected to one end of the resistor R10, one end of the resistor R8 and a non-inverting input terminal of the pre-amplifier Pre_Amplifier;

the inverting input pin RX_INN of the chip is connected to one end of the resistor R9, one end of the resistor R7 and an inverting input of the pre-amplifier Pre_Amplifier;

another end of the resistor R10 is connected to one end of the switch S1;

another end of the resistor R9 is connected to one end of the switch S2;

control ends of the switches S1 and S2 are connected to a reset signal line LA_RESET of the chip simultaneously;

a reference voltage Vref of the burst mode receiver RX is simultaneously connected to another end of the resistor R7, another end of the R8, another end of the switch S1 and another end of the switch S2.

Preferably, the continuous mode transmitter TX comprises an input buffer Input Buffer, a bypass ByPass, a clock data recovery CDR, a EML laser driver, and a bias current control unit, one of the bypass ByPass path or the clock data recovery CDR path is selected to activate;

an attenuated signal formed by an original high-speed electrical signal passing through a metal trace on a PCB board is connected to the input terminal of the input buffer INPUT BUFFER through the chip pins TX_INP and TX_INN, then the input buffer Input Buffer transmits the attenuated signal to the input terminal of the EML laser driver along an activated path; an output terminal of the EML laser driver is connected to a control terminal of the EML laser through a chip pin TX_OUTP;

a bias current output terminal of the bias current control unit is connected to the chip pin BIAS, and provides a bias current for the EML laser;

the host sends commands to the chip to turn off the bias current through the chip pin TXDIS to turn off the continuous mode transmitter TX.

Preferably, the activation of one of the bypass ByPass or the clock data recovery CDR path is controlled by digital control unit Digital according to an external command.

Preferably, the activation of one of the bypass ByPass path or the clock data recovery CDR path is controlled through the host automatically switching the channel by itself, when the rate is below 8G, the signal attenuation is not serious, and the bypass ByPass is activated; when the rate is 8G-14G, the signal attenuation is serious, and the clock data recovery CDR path is activated under the control of the host.

Preferably, the digital control unit Digital comprises a register digital core, an analog-to-digital converter ADC, a I²C slave and temperature sensor Temp Sensor;

an output terminal of the temperature sensor Temp Sensor is connected to a temperature signal input terminal of the register digital core through the analog-to-digital converter ADC;

an input terminal of I²C slave is connected to a pin SCL of a clock chip; an input and output terminals of I²C slave are connected to a pin SDA of an external command chip; an output terminal of I²C slave is connected to an external command input terminal of the register digital core, and the register digital core controls a path selection of the continuous mode transmitter TX; the register digital core also realizes a configuration of the burst mode receiver RX and the continuous mode transmitter TX through a control port.

Preferably, the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

Preferably, the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL;

an input terminal of the optical power control port APC is connected to a chip pin MPD for monitoring current.

Preferably, the power module POWER comprises a DC power supply VDC, a DC chopper DC/DC, and resistors R1 and R2;

the DC power supply VDC provides working power for the EML laser driver while the DC chopper DC/DC converts the DC power VDC into a DC power VCC1 and outputs it through the pin VOUT; the DC power supply VCC1 provides the working power for the burst mode receiver RX, the continuous mode transmitter TX and the digital control unit Digital respectively;

the output terminal VOUT of the DC chopper DC/DC is connected to one end of the resistor R1 and a chip pin CAP1 simultaneously; the chip pin CAP1 is grounded through a capacitor C2;

another end of the resistor R1 is simultaneously connected to one end of the resistor R2 and a feedback signal terminal FB of the DC chopper DC/DC;

another end of the resistor R2 is grounded;

a switch input port SW of the DC chopper DC/DC is connected to a chip pin SW1; the chip pin SW1 is connected to a positive terminal of the DC power supply VDC through an inductor L1;

a power supply voltage port VCC of the DC chopper DC/DC is connected to a chip pin VDC; the chip pin VDC is connected to the positive terminal of the DC power supply VDC; and an enable port EN of the DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded.

Preferably, the power module POWER comprises a DC power supply VDC, a DC power supply VCC, a first DC chopper DC/DC, a second DC chopper DC/DC, and resistors R1-R4;

the first DC chopper DC/DC converts the DC power supply VDC into a DC power supply VCC1 and outputs it through a pin VOUT; the DC power supply VCC1 provides working power for the burst mode receiver RX, the continuous mode transmitter TX and the digital control unit Digital respectively;

an output terminal VOUT of the first DC chopper DC/DC is connected to one end of the resistor R1 and a chip pin CAP1 simultaneously; the chip pin CAP1 is grounded through a capacitor C2; another end of the resistor R1 is simultaneously connected to one end of the resistor R2 and a feedback signal terminal FB of the first DC chopper DC/DC;

another end of the resistor R2 is grounded;

a switch input port SW of the first DC chopper DC/DC is connected to a chip pin SW1; the chip pin SW1 is connected to a positive terminal of the DC power supply VDC through an inductor L1; a power supply voltage port VCC of the first DC chopper DC/DC is connected to a chip pin VDC; the chip pin VDC is connected to the positive terminal of the DC power supply VDC;

an enable port EN of the first DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded;

the second DC chopper DC/DC converts the DC power supply VCC into a DC power supply VCC2 and outputs it through a pin VOUT; the DC power supply VCC2 provides working power for the EML laser driver;

the output terminal VOUT of the second DC chopper DC/DC is connected to one end of the resistor R3 and a chip pin CAP2 simultaneously; the chip pin CAP2 is grounded through a capacitor C4; another end of the resistor R3 is simultaneously connected to one end of the resistor R4 and a feedback signal terminal FB of the second DC chopper DC/DC;

another end of the resistor R4 is grounded;

a switch input port SW of the second DC chopper DC/DC is connected to a chip pin SW2; the chip pin SW2 is connected to a positive terminal of the DC power supply VCC through an inductor L2; a power supply voltage port VCC of the second DC chopper DC/DC is connected to a chip pin VCC; the chip pin VCC is connected to the positive terminal of the DC power supply VCC;

an enable port EN of the second DC chopper DC/DC is connected to a chip pin EN2; the chip pin EN2 is connected to one end of a capacitor C3 and the positive terminal of the DC power supply VCC at the same time; another end of the capacitor C3 is grounded, and a negative terminal of the DC power supply VCC is grounded.

The advantageous effect of the present invention: The present invention provides a circuit structure of a 10G rate OLT terminal transceiver integrated chip based on XGPON with EML laser. On the basis of the GPON protocol architecture, the rate is further improved, the downlink continuous data rate is increased from the basic 2.5 Gbps to and the uplink burst data rate is maintained at 2.5 Gbps, therefore the download rate to the ONU at the user end are greatly improved. The chip can well control the overall power consumption of the chip and meet the increasingly stringent communication protocol requirements. In order to transmit optical signals over long distances, EML laser driver is used to drive EML lasers, and the reasonable APC control forms a competitive advantage in terms of performance stability.

The present invention provides an overall framework structure of a 10G rate OLT terminal transceiver integrated chip based on XGPON and EML laser, which includes a 2.5 Gbps burst LA, a 10 Gbps continuous LD with CDR that can be turned off or turned on, a digital module to optimize eye diagram transmission quality, a built in fast recovery circuit which can meet the strict hardware timing sequence requirements of the XGPON protocol, a built-in power management module DCDC which can save peripheral hardware cost and space occupation, and is also conducive to the overall power consumption control of the transceiver integrated chip, and a high performance EML laser for ultra long distance transmission of optical signal.

DETAILED DESCRIPTION OF THE PREFERRED EMBODIMENT

Figure 1:
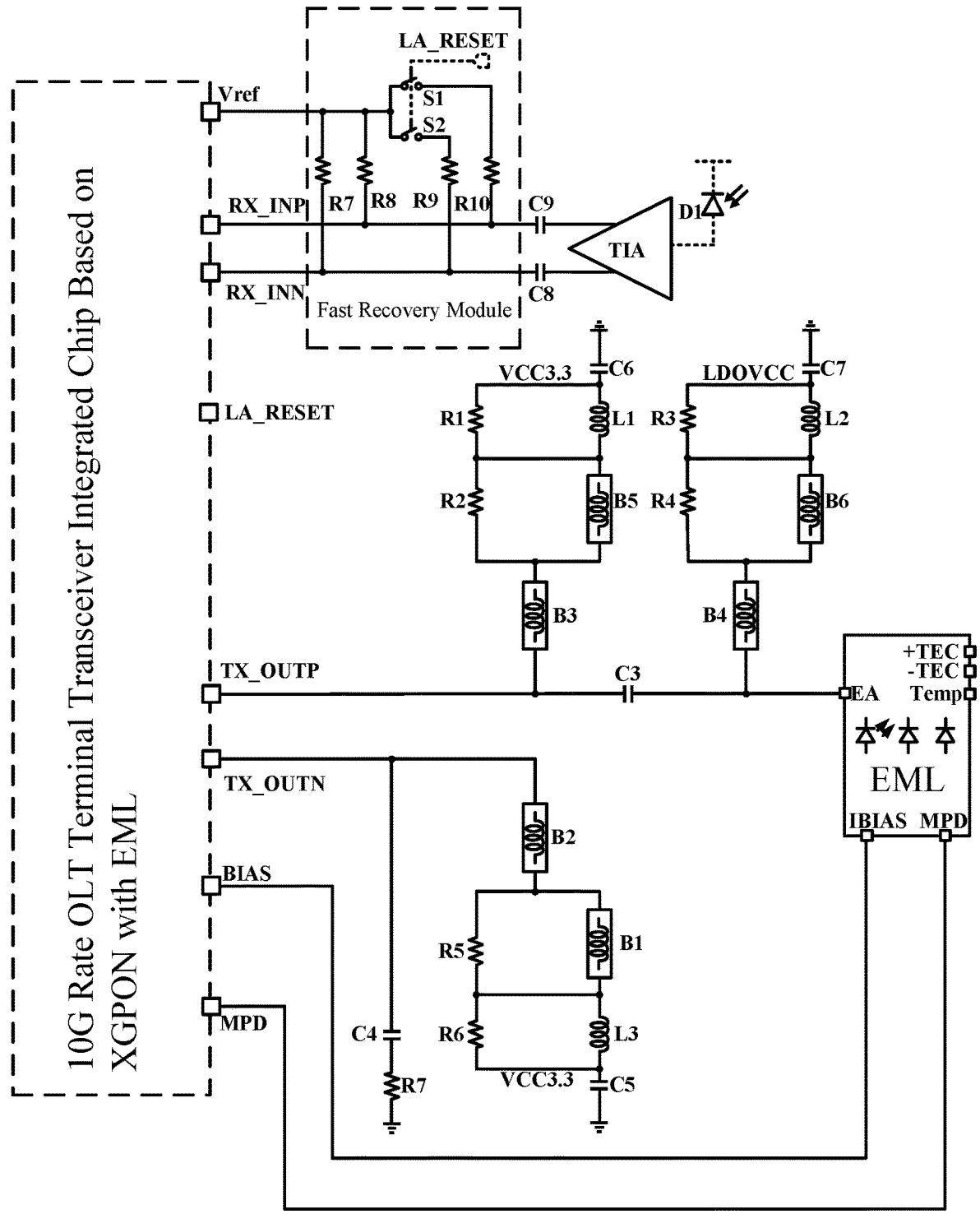
FIG. 1 is a schematic diagram based on XGPON with EML laser, and an external fast recovery circuit according to the present invention.

The following will clearly and completely describe the technical solutions in the embodiments of the present invention with reference to the accompanying drawings in the embodiments of the present invention. Clearly, the described embodiments are only some, not all, of the embodiments of the present invention. Based on the embodiments of the present invention, all other embodiments obtained by persons of ordinary skill in the art without creative efforts or inventive steps fall within the protection scope of the present invention.

According to the present invention, a 10G rate OLT terminal transceiver integrated chip based on XGPON and EML laser is provided. The fast recovery circuit in the receiver (RX) within the chip frame, the amplitude and frequency double-detection of the electrical signal transmitted from the TIA, the switchable start-stop clock data recovery (CDR) module in the transmitter (TX), the laser driver which is capable of driving of the EML laser, the modular and configurable digital part (Digital), and the embedded power management DCDC which precisely controls the power consumption of the entire chip are the keys to the realization of the present invention.

It should be noted that as long as there is no conflict, the different embodiments or the different features in different embodiments can be combined with each other.

The present invention is further described in conjunction with accompanying drawings and specific embodiment as follows, which is not intended to be limiting.

Preferred Embodiment 1: This embodiment is described below with reference to FIGS. 1-6. According to this embodiment, a 10G rate OLT terminal transceiver integrated chip based on XGPON and EML laser comprises: a burst mode receiver RX, a continuous mode transmitter TX, a digital control unit DIGITAL and a power module POWER.

The burst mode receiver RX amplifies an electrical signal which is originated from an optical signal from each ONU client and processed through a burst mode receiver TIA, processes amplitude and frequency double-detection of the electrical signal, outputs the detection result for signal whose amplitude and waveform pulse width meet the threshold requirements to a host, and uses a fast recovery module to control the timing to meet the XGPON protocol.

The continuous mode transmitter TX receives the electrical signal attenuated by a PCB board, and according to the degree of attenuation, selects the bypass BYPASS path for transmission or outputs the signal after the signal quality is improved through the clock data recovery CDR path.

The digital control unit DIGITAL is arranged to provide control signals to the burst mode receiver RX and the continuous mode transmitter TX.

The power module POWER is arranged for power supply to the chip.

The burst mode receiver RX comprises a pre-amplifier Pre_Amplifier, a signal detection unit, a 2.5G burst limiting amplifier BurstLA 2.5G, a current mode logic output buffer CML Buffer, a signal detection output buffer Buffer and a fast recovery module, wherein the signal detection unit comprises a level detector Level Detector and a frequency detector Frequency Detector;

a non-inverting input and an inverting input of the pre-amplifier Pre_Amplifier are arranged to receive a burst data packet (electrical signal) from the burst transimpedance amplifier TIA; the fast recovery module is arranged to provide a fast recovery circuit to ensure the timing is correct, so that physical collision of two burst data packets before and after is avoided;

an output terminal of the pre-amplifier Pre_Amplifier is simultaneously connected to an input terminal of the 2.5G burst limiting amplifier BurstLA 2.5G and an input terminal of the signal detection unit;

an output terminal of the 2.5G burst limiting amplifier BurstLA 2.5G is connected to an input terminal of the current mode logic output buffer CML Buffer;

an output terminal of the signal detection unit is simultaneously connected to an input terminal of the signal detection output buffer Buffer and an on/off control terminal of the current mode logic output buffer CML Buffer;

two output terminals of the current mode logic output buffer CML Buffer are connected to output pins RX_OUTP and RX_OUTN of the burst mode receiver RX respectively;

an output terminal of the signal detection output buffer BUFFER is connected to a chip pin RX_SD, and the burst mode receiver RX sends a detection result to the host through the chip pin RX_SD;

when a reset signal sent from the host is received by a chip pin LA_RESET, the chip sends a feedback signal to the host through the pin RX_SD.

In particular, the fast recovery module is built-in or external to the burst mode receiver RX.

Figure 2:
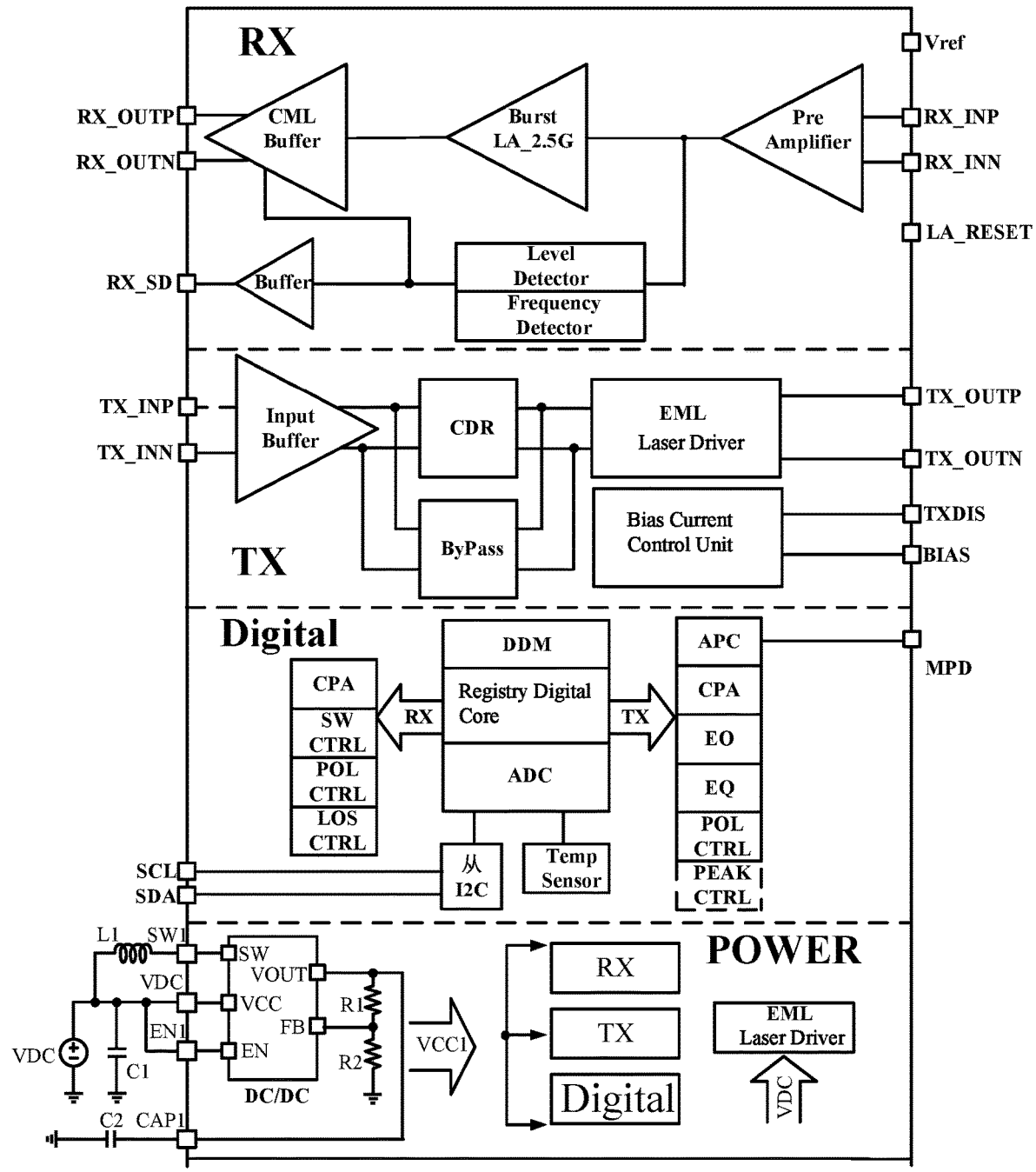
FIG. 2 is a structural schematic diagram of a 10G rate OLT terminal transceiver integrated chip based on XGPON and EML laser of FIG. 1, with an embodiment 1 of the power module POWER according to the present invention.
Figure 3:
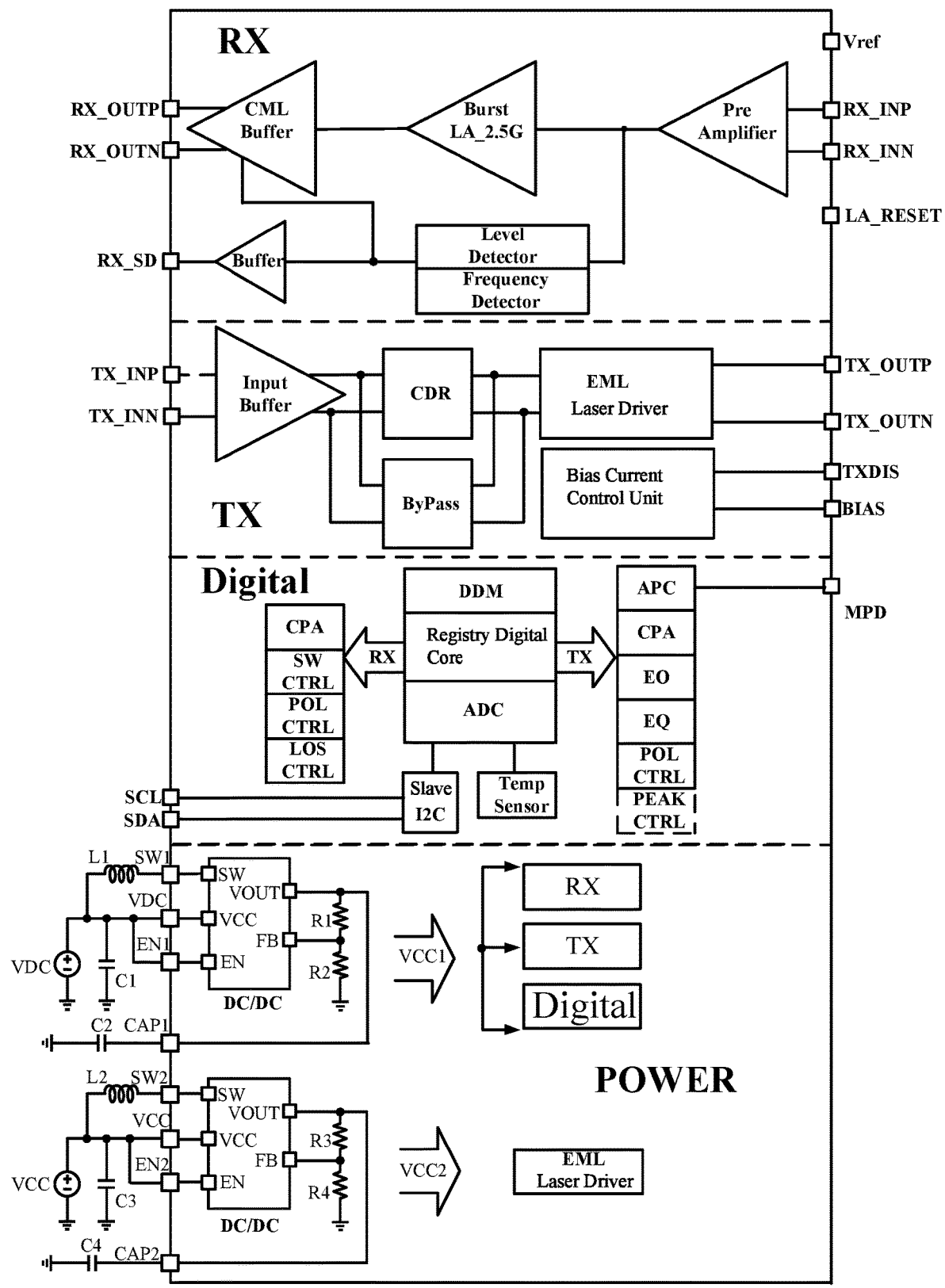
FIG. 3 is a structural schematic diagram of a 10G rate OLT terminal transceiver integrated chip based on XGPON and EML laser of FIG. 1, with an embodiment 2 of the power module POWER according to the present invention.

Referring to FIG. 1 to FIG. 3 of the drawings, the fast recovery module is built-in or external to the burst mode receiver RX. The fast recovery module comprises resistors R7, R8, R9, R10, and switches S1 and S2.

When the fast recovery module is external to the burst mode receiver RX, a non-inverting output terminal of the burst transimpedance amplifier TIA is connected to one end of the resistor R10 of the fast recovery module, one end of the resistor R8 of the fast recovery module and a non-inverting input pin RX_INP of the chip through an AC coupling capacitor C9;
an inverting output terminal of the burst transimpedance amplifier TIA is connected to one end of the resistor R9 of the fast recovery module and one end of the resistor R7 of the fast recovery module, and an inverting input pin RX_INN of the chip through the AC coupling capacitor C8;
a non-inverting input pin RX_INP of the chip and an inverting input pin RX_INN of the chip are connected to a non-inverting input terminal and an inverting input terminal of the pre-amplifier Pre_Amplifier respectively;
another end of the resistor R10 is connected to one end of the switch S1;
another end of the resistor R9 is connected to one end of the switch S2;
control ends of the switches S1 and S2 are connected to a reset signal line LA_RESET simultaneously; and
a reference voltage pin Vref of the burst mode receiver RX is simultaneously connected to another end of the resistor R7, another end of the R8, another end of the switch S1 and another end of the switch S2.

Figure 4:
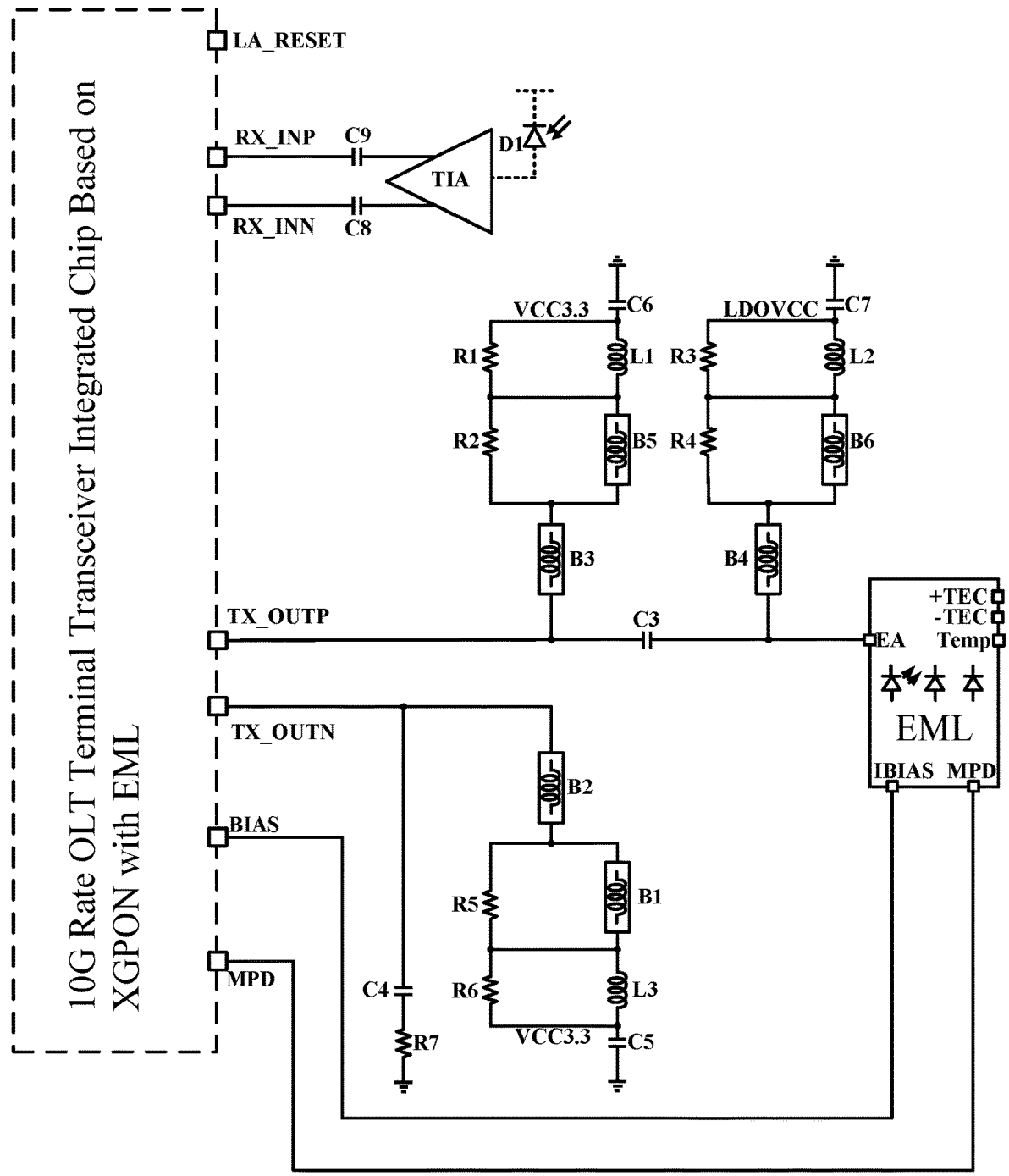
FIG. 4 is a schematic diagram based on XGPON with EML laser, and a built-in fast recovery circuit according to the present invention.
Figure 5:
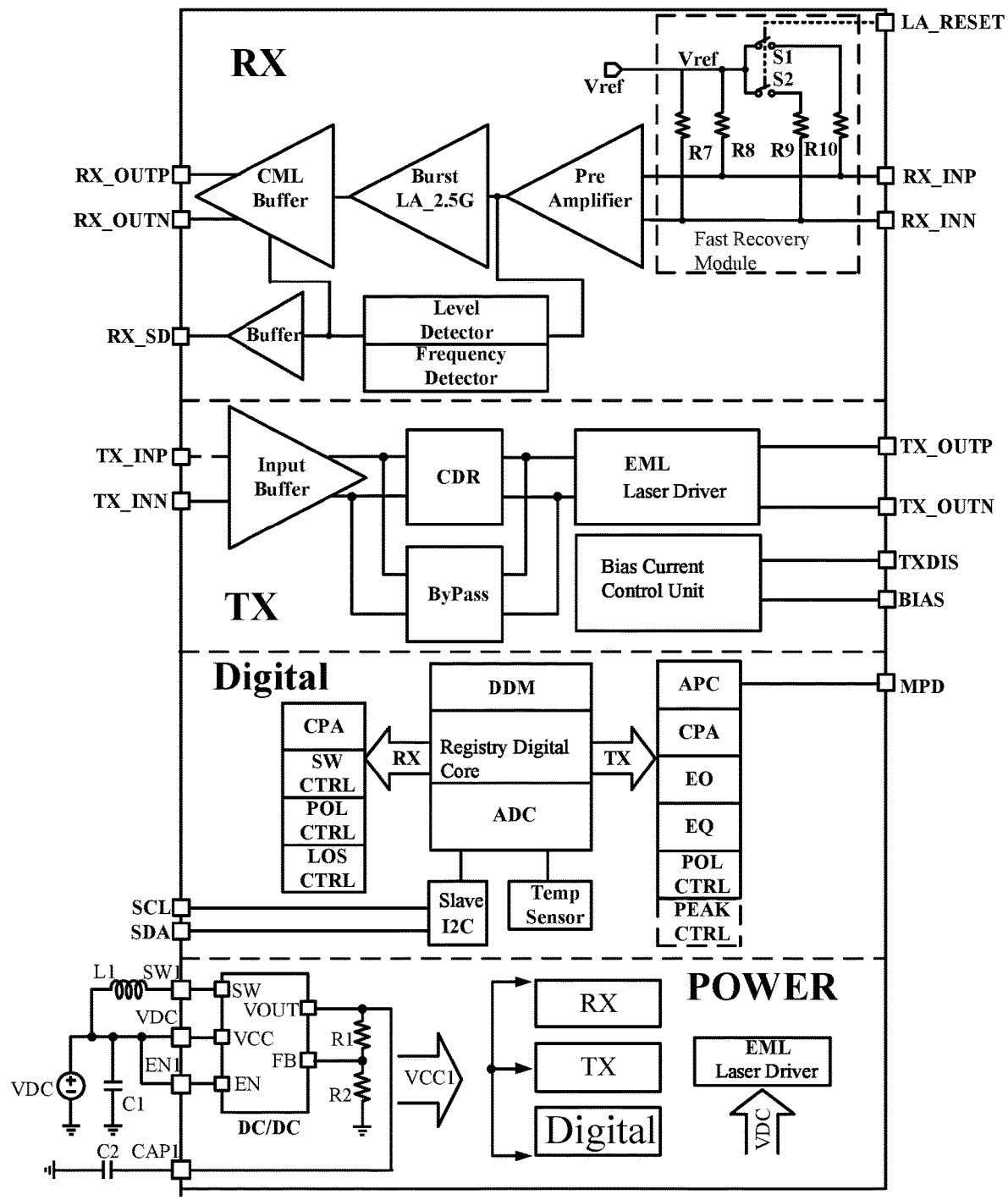
FIG. 5 is a structural schematic diagram of a 10G rate OLT terminal transceiver integrated chip based on XGPON and EML laser of FIG. 4, with an embodiment 1 of the power module POWER according to the present invention.
Figure 6:
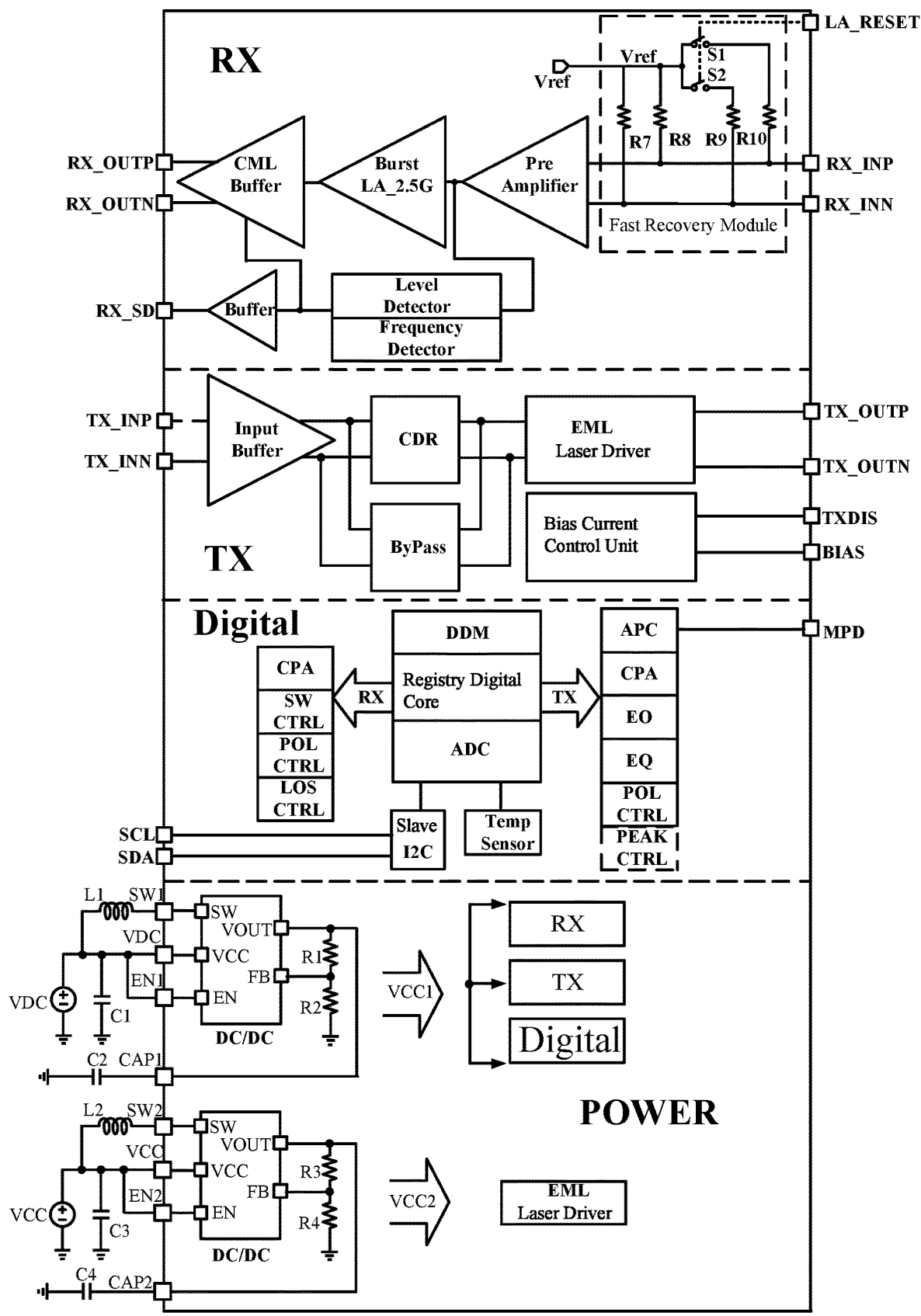
FIG. 6 is a structural schematic diagram of a 10G rate OLT terminal transceiver integrated chip based on XGPON and EML laser of FIG. 4, with an embodiment 2 of the power module POWER according to the present invention.

Referring to FIGS. 4-6 of the drawings, when the fast recovery module is built in the burst mode receiver RX, a non-inverting output terminal and an inverting output terminal of the burst transimpedance amplifier TIA are connected to a non-inverting input pin RX_INP and an inverting input pin RX_INN of the chip through AC coupling capacitors C9 and C8;
inside the chip, the non-inverting input pin RX_INP of the chip is connected to one end of the resistor R10, one end of the resistor R8 and a non-inverting input terminal of the pre-amplifier Pre_Amplifier;
the inverting input pin RX_INN of the chip is connected to one end of the resistor R9, one end of the resistor R7 and an inverting input of the pre-amplifier Pre_Amplifier;
another end of the resistor R10 is connected to one end of the switch S1;
another end of the resistor R9 is connected to one end of the switch S2;
control ends of the switches S1 and S2 are connected to a reset signal line LA_RESET of the chip simultaneously; and
a reference voltage Vref of the burst mode receiver RX is simultaneously connected to another end of the resistor R7, another end of the R8, another end of the switch S1 and another end of the switch S2.

When the built-in configuration is used, the fast recovery module is built into the transceiver integrated chip, which has the advantage of reducing the footprint of the peripheral circuit and saving costs.

The working principles of the burst mode receiver RX: The OLT transceiver integrated chip located in the central office corresponds to multiple ONUs at the user end, therefore the receiving terminal RX of the OLT transceiver integrated chip needs to receive bursts of electrical signals of different amplitudes and frequencies from the ONU terminal (burst TIA has converted optical signals of different amplitudes into electrical signals and then sent them to the limiting amplifier LA of RX). The pre-amplifier Pre-Amplifier enhances (pre-emphasizes) the attenuated electrical signal output by the upper TIA, and then divides the electrical signal into two paths. One of the path is passing to the LA_2.5G limiting amplifier to amplify the signal to the limited state. The other path is passing to the signal detection module, which detects the amplitude and frequency of the signal. Only when the amplitude and waveform pulse width meet the threshold requirements, the signal detection module outputs a command to turn on the output driver stage CML Buffer, and at the same time transmits the judgment result to the host which is external to the chip (through the RX_SD pin). In order to meet the strict timing sequence requirement protocol of XGPON, a fast recovery circuit must be added in the RX part, so that after the burst LA completes the reception of a data packet, it can immediately return to the normal state, and then continue to receive the next burst data packet such that the physical collision of two adjacent data packets can be avoided. The chip pin Vref provides a DC operating point for the two input terminals of LA, and also discharges the charge of the capacitors C8 and C9 which are connected to the two input terminals of LA. When the reset signal LA_RESET is 0, the switches S1 and S2 are turned off, and the charges on the capacitor is slowly discharged to the ground through the resistor R7=R8 (large resistance value). When the reset signal LA_RESET is 1, the switches S1 and S2 are turned on, and the charges on the capacitor is quickly discharged to the ground through the resistor R9=R10 (small resistance value) so as to achieve the quickly rebuilding of the DC operating point. By adjusting the resistance of resistors R7, R8, R9, R10, the performance requirements and timing sequence requirements of RX are met. The voltage value of Vref can be artificially set through the two communication signal lines of the digital part. The reset signal LA_RESET is given by the host.

The continuous mode transmitter TX comprises an input buffer Input Buffer, a bypass ByPass, a clock data recovery CDR, a EML laser driver, and a bias current control unit,
one of the bypass ByPass path or the clock data recovery CDR path is selected to activate;
an attenuated signal formed by an original high-speed electrical signal passing through a metal trace on a PCB board is connected to the input buffer Input Buffer through the chip pins TX_INP and TX_INN, then the input buffer Input Buffer transmits the attenuated signal to the input terminal of the EML laser driver along the activated path; an output terminal of the EML laser driver is connected to a control terminal of the EML laser through chip pin TX_OUTP;
a bias current output terminal of the bias current control unit is connected to the chip pin BIAS, and provides a bias current for the EML laser;
the host sends commands to the chip to turn off the bias current through the chip pin TXDIS to turn off the continuous mode transmitter TX.

The activation of one of the bypass ByPass path or the clock data recovery CDR path is controlled by digital control unit Digital according to an external command.

The activation of one of the bypass ByPass or the clock data recovery CDR path is controlled through the host automatically switching the path by itself, when the rate is below 8G, the signal attenuation is not serious, and the bypass ByPass is activated; when the rate is 8G-14G, the signal attenuation is serious, and the clock data recovery CDR path is activated under the control of the host.

The working principles of continuous mode transmitter TX: The TX part of the main channel is capable of receiving and processing continuous electrical signal data streams with a rate of 1-14 Gbps. The original high-speed electrical signal is attenuated after passing through the metal traces on the PCB board, resulting in signal errors. In order to solve the problem of high-speed signal attenuation, CDR (clock data recovery) is added inside the TX to improve the quality of high-speed signal. If the attenuation of the high-speed signal is not serious, it can also be transmitted directly from the ByPass path. The EML laser driver connects the EML laser and some peripheral circuits (resistors R1-R4, inductors L1-L2, capacitors C6-C7, magnetic beads B3-B6) through the pin TX_OUTP, and connects part of the peripheral circuits (resistors R5-R6, inductor L3, capacitor C5, magnetic beads B1-B2) through the pin TX_OUTN, details of which is illustrated in FIG. 1. EML-type lasers support ultra-long-distance (≥100 km) data transmission, and the output modulation voltage provided inside TX can be adjusted according to actual usage (optical power, extinction ratio). The bias current Bias of the EML laser driver need to adjust the current in real time according to the ambient temperature, the luminous efficiency of the laser, and the aging of the laser. Therefore, the bias current control unit cooperates with the APC optical power control module to feed back the average optical power information of the laser collected by the monitoring photodiode MPD, and configure a reasonable current value through the data writing of the digital part. When the host reads that the key parameters of the transceiver chip exceed the reasonable range, it can turn off the transmitting part through the chip pin TXDIS to avoid damage to the EML laser.

The EML laser brings together the electro-absorption modulator EA and the semiconductor cooler TEC at the same time. The Temp pin of the TEC feeds back the voltage converted from the internal temperature of the EML laser to the TEC control chip. According to the operating temperature of the EML laser, the TEC control chip adjusts the ambient temperature of the EML laser in real time through the current flowing through pins +TEC and −TEC to make it work in the best state, Therefore, the current required by the TEC for heat dissipation occupies a large part of the overall power consumption of the optical module. In order to meet the overall power consumption requirement of the optical module, it is necessary to further reduce the power consumption of the integrated transceiver chip.

The activation of one of the bypass ByPass or the clock data recovery CDR path includes the following two configurations:

Type 1: Pre-judgment, and then write the external command into the digital control unit Digital through the SAD pin according to the judgment result, and the digital control unit Digital sends the selection command to the TX. Pre-judgment refers to the selection of the bypass ByPass path or the clock data recovery CDR path, which is judged based on the attenuation of the signal measured by the chip. Before using the chip, first detect the attenuated signal generated after passing through the metal wiring on the PCB board, and check whether the quality of the TX output eye diagram meets the protocol standard. If it meets the standard, it will be transmitted from bypass ByPass, and if it does not meet the standard, CDR will be turned on to optimize the signal quality.

Type 2: The host switches channels by itself. When the rate is below 8G, the signal attenuation is not serious, and ByPass is activated; when the rate is 8G-14G, the signal attenuation is serious, and the host controls the clock data recovery CDR path to optimize signal quality.

The digital control unit Digital comprises a register digital core, an analog-to-digital converter ADC, a I²C slave and temperature sensor Temp Sensor;

an output terminal of the temperature sensor Temp Sensor is connected to a temperature signal input terminal of the register digital core through the analog-to-digital converter ADC;

an input terminal of I²C slave is connected to a pin SCL of a clock chip; an input and output ports of I²C slave are connected to a chip pin SDA of an external command; an output terminal of I²C slave is connected to an external command input terminal of the register digital core, and the register digital core controls a path selection of the continuous mode transmitter TX; the register digital core also realizes a configuration of the burst mode receiver RX and the continuous mode transmitter TX through a control port.

The control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

The control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL;

an input terminal of the optical power control port APC is connected to a chip pin MPD for monitoring current.

The working principle of the digital control unit Digital: The digital control unit Digital can complete the internal configuration of the burst mode receiver RX and the continuous mode transmitter TX.

The functions configurable in the burst mode receiver RX are:

eye diagram cross point adjustment CPA, output swing control SW_CTRL, output polarity inversion POL_CTRL, signal loss threshold setting and mode selection LOS_CTRL, etc.

The configurable functions in the continuous mode transmitter TX are:

laser optical power control APC, eye diagram intersection optimization CPA, jitter optimization EQ, eye diagram optimization EO, output polarity inversion POL_CTRL, and modulation voltage peak-to-peak control PEAK_CTRL, etc. The built-in high-precision multi-bit ADC converts the ambient temperature collected by the temperature sensor Temp Sensor into a digital value and then reads it to the outside through the I²C slave data signal line SDA. ADC can also read other quantifiable data to the outside through I²C slave, such as monitoring current value, bias current value, etc. Users can also write digital quantities to the register digital core inside the chip through the master I²C which is external to the chip to optimize the different transmission performance of the integrated transceiver chip.

The digital control unit also adds a digital diagnostics monitoring (DDM) function to monitor light level, chip temperature, power supply voltage and other data in real time.

There are two embodiments for the power module POWER:

Embodiment 1: Referring to FIG. 2 and FIG. 4, the power module POWER comprises a DC power supply VDC, a DC chopper DC/DC, and resistors R1 and R2.

The DC power supply VDC provides working power for the EML laser driver while the DC chopper DC/DC converts the DC power VDC into a DC power VCC1 and outputs it through the pin VOUT. The DC power supply VCC1 provides the working power for the burst mode receiver RX, the continuous mode transmitter TX and the digital control unit Digital respectively.

The output terminal VOUT of the DC chopper DC/DC is connected to one end of the resistor R1 and the chip pin CAP1 simultaneously; the chip pin CAP1 is grounded through the capacitor C2;

another end of the resistor R1 is simultaneously connected to one end of the resistor R2 and a feedback signal terminal FB of the DC chopper DC/DC;

another end of the resistor R2 is grounded;

a switch input port SW of the DC chopper DC/DC is connected to a chip pin SW1; the chip pin SW1 is connected to a positive terminal of the DC power supply VDC through an inductor L1;

a power supply voltage port VCC of the DC chopper DC/DC is connected to the chip pin VDC; the chip pin VDC is connected to the positive terminal of the DC power supply VDC; and an enable port EN of the DC chopper DC/DC is connected to the chip pin EN1; the chip pin EN1 is connected to one end of the capacitor C1 and the positive terminal of the DC power supply VDC at the same time; another end of the capacitor C1 is grounded, and the negative terminal of the DC power supply VDC is grounded.

Embodiment 2: Referring to FIG. 4 and FIG. 6, the power module POWER comprises a DC power supply VDC, a DC power supply VCC, a first DC chopper DC/DC, a second DC chopper DC/DC, and resistors R1-R4.

The first DC chopper DC/DC converts the DC power supply VDC into a DC power supply VCC1 and outputs it through the pin VOUT. The DC power supply VCC1 provides the working power for the burst mode receiver RX, the continuous mode transmitter TX and the digital control unit Digital respectively.

The output terminal VOUT of the first DC chopper DC/DC is connected to one end of the resistor R1 and the chip pin CAP1 simultaneously; the chip pin CAP1 is grounded through the capacitor C2.

Another end of the resistor R1 is simultaneously connected to one end of the resistor R2 and a feedback signal terminal FB of the first DC chopper DC/DC.

Another end of the resistor R2 is grounded.

A switch input port SW of the first DC chopper DC/DC is connected to the chip pin SW1; the chip pin SW1 is connected to the positive terminal of the DC power supply VDC through the inductor L1.

A power supply voltage port VCC of the first DC chopper DC/DC is connected to the chip pin VDC; the chip pin VDC is connected to the positive terminal of the DC power supply VDC.

An enable port EN of the first DC chopper DC/DC is connected to the chip pin EN1; the chip pin EN1 is connected to one end of the capacitor C1 and the positive terminal of the DC power supply VDC at the same time; another end of the capacitor C1 is grounded, and the negative terminal of the DC power supply VDC is grounded.

The second DC chopper DC/DC converts the DC power supply VCC into a DC power supply VCC2 and outputs it through a pin VOUT. The DC power supply VCC2 provides the working power for the EML laser driver.

The output terminal VOUT of the second DC chopper DC/DC is connected to one end of the resistor R3 and the chip pin CAP2 simultaneously; the chip pin CAP2 is grounded through the capacitor C4.

Another end of the resistor R3 is simultaneously connected to one end of the resistor R4 and a feedback signal terminal FB of the second DC chopper DC/DC;

Another end of the resistor R4 is grounded.

A switch input port SW of the second DC chopper DC/DC is connected to the chip pin SW2; the chip pin SW2 is connected to the positive terminal of the DC power supply VCC through the inductor L2.

A power supply voltage port VCC of the second DC chopper DC/DC is connected to the chip pin VCC; the chip pin VCC is connected to the positive terminal of the DC power supply VCC.

An enable port EN of the second DC chopper DC/DC is connected to the chip pin EN2; the chip pin EN2 is connected to one end of the capacitor C3 and the positive terminal of the DC power supply VCC at the same time; another end of the capacitor C3 is grounded, and the negative terminal of the DC power supply VCC is grounded.

The key point of the power management part of the present invention is the built-in DC/DC module.

The traditional power supply scheme of the transceiver integrated chip with EML laser is to provide the power supply voltage VDC to the transceiver integrated chip, and then reduce VDC to VCC1 through the LDO inside the chip. For example, 3.3V is reduced to 1.8V inside the chip, and the efficiency of LDO as a power supply is usually low. The overall power consumption of the chip in this type of scheme is 870 mW.

The advantages of the power supply part of the present invention will be analyzed below in conjunction with two specific embodiments.

Embodiment 1: Referring to FIG. 2 of the drawings, VCC=3.3V, VCC1=1.8V, a DC/DC with higher power supply efficiency is used to replace LDO with low power supply efficiency. The power supply voltage 1.8V generated by DC/DC is supplied to the RX part, TX part, and digital part. The EML laser driver of the TX part still uses a 3.3V power supply voltage. The overall power consumption of this embodiment is 710 mW, saving 160 mW power consumption.

Compared with the traditional power supply solution with a DC/DC chip external to the transceiver integrated chip with EML laser, an initial 3.3V of the power supply voltage is reduced to 1.8V and then supplied to the integrated transceiver chip. The traditional DC/DC chip needs to be purchased separately, which is expensive and occupies PCB board area, thus not conducive to reducing the cost and miniaturization of optical modules. Moreover, the generalized DC/DC cannot meet the increasingly digital design requirements of transceiver integrated chips. According to the present invention, a DC/DC is built into the integrated transceiver chip based on the power consumption requirement of the integrated transceiver chip, and this customized DC/DC has the characteristics of small area and strong performance. Therefore, the cost and power consumption of the whole module are reduced.

Embodiment 2: Referring to FIG. 3 of the drawings, two DC/DC modules are designed. The DC/DC module is designed into multiple voltage output modes to meet the different power domains in the chip. For example, in the design of two voltage output ports of 3.6V and 1.8V, VCC=3.3V, boost output VCC2=3.6V for EML laser driver, and VDC=3.3V, step-down output VCC1=1.8V for RX part, TX part, digital part. DCDC can step up or step down, depending on performance requirements. The ways to adjust the output voltage include laser trimming and fuse trimming, one-time programmable and register programming, etc.

According to the present invention, the 10G rate OLT terminal transceiver integrated chip based on XGPON and EML laser uses amplitude detection and frequency detection at the 2.5G burst receiving end RX to simultaneously judge whether the input signal meets the requirements of the transmission protocol, and can have a built-in or external fast recovery circuit, which can allow the AC coupling capacitor to quickly discharge the charge and establish a stable working point for the next data packet reception. A high-speed clock data recovery unit CDR is built in the 10G continuous transmitting end TX to ensure the integrity of the electrical signal to be transmitted, which is conducive to the laser emitting high-quality light. In order to drive ultra-long-distance EML lasers, the built-in EML laser driver cooperates with the APC module to quickly and adaptively adjust the bias current so that the laser can obtain the best light-emitting state. In the digital control unit, there are built-in multi-bit registers, high-precision ADC and I$^2$C slave. All kinds of key data are transmitted to the outside through the SDA signal line, and the digital quantities of related modules with optimized performance can also be written through this line to ensure the high quality of the sending and receiving signal of the transceiver integrated chip. The DDM module reads the key working information in the chip in real time, and when the threshold is exceeded, the transceiver integrated chip can be turned off to avoid damage to the chip and laser.

The most important part is to ensure that the 10G rate OLT transceiver integrated chip based on XGPON and EML laser can meet the power consumption requirements in the industry, and a diversified and configurable DCDC is tailored to be embedded in the chip. It has advantages in performance and area, and reduces the design cost and occupied area of peripheral circuits.

Although the present invention is described herein with reference to specific embodiments, it should be understood that these embodiments are merely illustrative of the principles and applications of the present invention. It is therefore to be understood that numerous modifications may be made to the exemplary embodiments and that other arrangements may be devised without departing from the spirit and scope of the present invention as defined by the appended claims. It shall be understood that different dependent claims and features described herein may be combined in a different way than that described in the original claims. It should also be appreciated that features described in connection with individual embodiments can be used in other described embodiments.

What is claimed is:

1. A 10G rate OLT terminal transceiver integrated chip based on XGPON and EML laser, comprising:
    a burst mode receiver RX, a continuous mode transmitter TX and a digital control unit DIGIITAL, and a power module POWER;
    wherein the burst mode receiver RX amplifies an electrical signal which is originated from an optical signal from each ONU client and processed through a burst mode receiver TIA, processes amplitude and frequency double-detection of the electrical signal to determine if the electrical signal whose amplitude and waveform pulse width met threshold requirements, and output a detection result to a host, and uses a fast recovery module to control the timing sequence to meet the XGPON protocol;
    the continuous mode transmitter TX receives the electrical signal attenuated by a PCB board, and in response to a degree of attenuation, selects a bypass path BYPASS for transmission or outputs the electrical signal after a signal quality of the electrical signal is processed and improved by a clock data recovery path CDR to drive the EML laser;
    the digital control unit DIGIITAL provides control signals to the burst mode receiver RX and the continuous mode transmitter TX; and
    the power module POWER is arranged to provide power supply to the chip,
    the burst mode receiver RX comprises a pre-amplifier Pre_Amplifier, a signal detection unit, a 2.5G burst limiting amplifier BurstLA 2.5G, a current mode logic output buffer CML Buffer, a signal detection output buffer Buffer and a fast recovery module, wherein the signal detection unit comprises a level detector LEVEL DETECTOR and a frequency detector FREQUENCY DETECTOR;
    a non-inverting input and an inverting input of the pre-amplifier Pre_Amplifier are arranged to receive a burst data packet (the electrical signal) from the burst transimpedance amplifier TIA; the fast recovery module is arranged to provide a fast recovery circuit to ensure a timing is correct, so that physical collision of two adjacently time sequenced burst data is avoided;
    an output terminal of the pre-amplifier Pre_Amplifier is simultaneously connected to an input terminal of the 2.5G burst limiting amplifier BurstLA 2.5G and an input terminal of the signal detection unit;
    an output terminal of the 2.5G burst limiting amplifier BurstLA 2.5G is connected to an input terminal of the current mode logic output buffer CML Buffer;
    an output terminal of the signal detection unit is simultaneously connected to an input terminal of the signal detection output buffer Buffer and an on/off control terminal of the current mode logic output buffer CML Buffer;
    two output terminals of the current mode logic output buffer CML Buffer are connected to output pins RX_OUTP and RX_OUTN of the burst mode receiver RX respectively;
    an output terminal of the signal detection output buffer BUFFER is connected to a chip pin RX_SD, and the burst mode receiver RX sends a detection result to the host through the chip pin RX_SD;
    wherein in response to a reset signal sent by the host and received by a chip pin LA_RESET, the chip sends a feedback signal to the host through the pin RX_SD,
    the fast recovery module is built-in or external to the burst mode receiver RX, and the fast recovery module comprises resistors R7, R8, R9, R10, and switches S1 and S2,
    when the fast recovery module is external to the burst mode receiver RX, a non-inverting output terminal of the burst transimpedance amplifier TIA is connected to one end of the resistor R10 of the fast recovery module, one end of the resistor R8 of the fast recovery module and a non-inverting input pin RX_INP of the chip through an AC coupling capacitor C9;
    an inverting output terminal of the burst transimpedance amplifier TIA is connected to one end of the resistor R9 and one end of the resistor R7 of the fast recovery module, and an inverting input pin RX_INN of the chip through the AC coupling capacitor C8;
    a non-inverting input pin RX_INP of the chip and an inverting input pin RX_INN of the chip are connected to a non-inverting input terminal and an inverting input terminal of the pre-amplifier Pre_Amplifier respectively;

another end of the resistor R10 is connected to one end of the switch S1;

another end of the resistor R9 is connected to one end of the switch S2;

control ends of the switches S1 and S2 are connected to a reset signal line LA_RESET simultaneously; and a reference voltage pin Vref of the burst mode receiver RX is simultaneously connected to another end of the resistor R7, another end of the R8, another end of the switch S1 and another end of the switch S2, when the fast recovery module is built in the burst mode receiver RX, a non-inverting output terminal and an inverting output terminal of the burst transimpedance amplifier TIA are connected to a non-inverting input pin RX_INP of the chip and an inverting input pin RX_INN of the chip through AC coupling capacitors C9 and C8;

inside the chip, the non-inverting input pin RX_INP of the chip is connected to one end of the resistor R10, one end of the resistor R8 and a non-inverting input terminal of the pre-amplifier Pre_Amplifier;

the inverting input pin RX_INN of the chip is connected to one end of the resistor R9, one end of the resistor R7 and an inverting input of the pre-amplifier Pre_Amplifier;

another end of the resistor R10 is connected to one end of the switch S1;

another end of the resistor R9 is connected to one end of the switch S2;

control ends of the switches S1 and S2 are connected to a reset signal line LA_RESET of the chip simultaneously; and a reference voltage Vref of the burst mode receiver RX is simultaneously connected to another end of the resistor R7, another end of the R8, another end of the switch S1 and another end of the switch S2.

2. The 10G rate OLT terminal transceiver integrated chip based on XGPON and EML laser according to claim 1, wherein the continuous mode transmitter TX comprises an input buffer INPUT BUFFER, the bypass ByPass, the clock data recovery CDR, a EML laser driver, and a bias current control unit, wherein one of the bypass ByPass path or the clock data recovery CDR path is selected to activate, an attenuated signal formed by an original high-speed electrical signal (the burst data packet) passing through a metal trace on a PCB board is connected to the input buffer INPUT BUFFER through the chip pins TX_INP and TX_INN, then the input buffer INPUT BUFFER transmits the attenuated signal to the input terminal of the EML laser driver along the activated path; an output terminal of the EML laser driver is connected to a control terminal of the EML laser through chip pin TX_OUTP;

a bias current output terminal of the bias current control unit is connected to the chip pin BIAS, and provides a bias current for the EML laser;

the host sends commands to the chip to turn off the bias current through the chip pin TXDIS to turn off the continuous mode transmitter TX.

3. The 10G rate OLT terminal transceiver integrated chip based on XGPON and EML laser according to claim 2, wherein the activation of one of the bypass ByPass or the clock data recovery CDR path is controlled by digital control unit DIGITAL according to an external command.

4. The 10G rate OLT terminal transceiver integrated chip based on XGPON and EML laser according to claim 2, wherein the activation of one of the bypass ByPass path or the clock data recovery CDR path is controlled by the host switching a path automatically by itself, if a detected rate of the original high-speed electrical signal is below 8G, the signal attenuation is not serious, and the bypass ByPass path is activated; if the detected rate of the original high-speed electrical signal is 8G-14G, the signal attenuation is serious, and the clock data recovery CDR path is activated by the host.

5. The 10G rate OLT terminal transceiver integrated chip based on XGPON and EML laser according to claim 1, the digital control unit DIGITAL comprises a register digital core, an analog-to-digital converter ADC, a $I^2C$ slave and temperature sensor TEMP SENSOR;

an output terminal of the temperature sensor TEMP SENSOR is connected to a temperature signal input terminal of the register digital core through the analog-to-digital converter ADC;

an input terminal of $I^2C$ slave is connected to a pin SCL of a clock chip; an input and output ports of $I^2C$ slave are connected to a pin SDA of an external command chip; an output terminal of $I^2C$ slave is connected to an external command input terminal of the register digital core, and the register digital core controls a path activation of the continuous mode transmitter TX; the register digital core also realizes a configuration of the burst mode receiver RX and the continuous mode transmitter TX through a control port.

6. The 10G rate OLT terminal transceiver integrated chip based on XGPON and EML laser according to claim 5, wherein the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL;

wherein the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL; and an input terminal of the optical power control port APC is connected to a chip pin MPD for monitoring current.

7. The 10G rate OLT terminal transceiver integrated chip based on XGPON and EML laser according to claim 1, wherein the power module POWER comprises a DC power supply VDC, a DC chopper DC/DC, and resistors R1 and R2;

wherein the DC power supply VDC provides working power for the EML laser driver while the DC chopper DC/DC converts the DC power VDC into a DC power VCC1 and outputs it through the pin VOUT; the DC power supply VCC1 provides the working power for the burst mode receiver RX, the continuous mode transmitter TX and the digital control unit Digital respectively;

the output terminal VOUT of the DC chopper DC/DC is connected to one end of the resistor R1 and a chip pin CAP1 simultaneously; the chip pin CAP1 is grounded through a capacitor C2;

another end of the resistor R1 is simultaneously connected to one end of the resistor R2 and a feedback signal terminal FB of the DC chopper DC/DC;

another end of the resistor R2 is grounded;

a switch input port SW of the DC chopper DC/DC is connected to a chip pin SW1; the chip pin SW1 is connected to a positive terminal of the DC power supply VDC through an inductor L1;

a power supply voltage port VCC of the DC chopper DC/DC is connected to a chip pin VDC; the chip pin VDC is connected to the positive terminal of the DC power supply VDC; and an enable port EN of the DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded.

8. The 10G rate OLT terminal transceiver integrated chip based on XGPON and EML laser according to claim 1, wherein the power module POWER comprises a DC power supply VDC, a DC power supply VCC, a first DC chopper DC/DC, a second DC chopper DC/DC, and resistors R1-R4;

wherein the first DC chopper DC/DC converts the DC power supply VDC into a DC power supply VCC1 and outputs it through a pin VOUT; the DC power supply VCC1 provides working power for the burst mode receiver RX, the continuous mode transmitter TX and the digital control unit Digital respectively;

an output terminal VOUT of the first DC chopper DC/DC is connected to one end of the resistor R1 and a chip pin CAP1 simultaneously; the chip pin CAP1 is grounded through a capacitor C2;

another end of the resistor R1 is simultaneously connected to one end of the resistor R2 and a feedback signal terminal FB of the first DC chopper DC/DC;

another end of the resistor R2 is grounded;

a switch input port SW of the first DC chopper DC/DC is connected to a chip pin SW1; the chip pin SW1 is connected to a positive terminal of the DC power supply VDC through an inductor L1;

a power supply voltage port VCC of the first DC chopper DC/DC is connected to a chip pin VDC; the chip pin VDC is connected to the positive terminal of the DC power supply VDC;

an enable port EN of the first DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded;

the second DC chopper DC/DC converts the DC power supply VCC into a DC power supply VCC2 and outputs it through a pin VOUT; the DC power supply VCC2 provides working power for the EML laser driver;

the output terminal VOUT of the second DC chopper DC/DC is connected to one end of the resistor R3 and a chip pin CAP2 simultaneously; the chip pin CAP2 is grounded through a capacitor C4;

another end of the resistor R3 is simultaneously connected to one end of the resistor R4 and a feedback signal terminal FB of the second DC chopper DC/DC;

another end of the resistor R4 is grounded;

a switch input port SW of the second DC chopper DC/DC is connected to a chip pin SW2; the chip pin SW2 is connected to a positive terminal of the DC power supply VCC through an inductor L2;

a power supply voltage port VCC of the second DC chopper DC/DC is connected to a chip pin VCC; the chip pin VCC is connected to the positive terminal of the DC power supply VCC;

an enable port EN of the second DC chopper DC/DC is connected to a chip pin EN2; the chip pin EN2 is connected to one end of a capacitor C3 and the positive terminal of the DC power supply VCC at the same time; another end of the capacitor C3 is grounded, and a negative terminal of the DC power supply VCC is grounded.

* * * * *